United States Patent Office 3,263,601
Patented August 2, 1966

3,263,601
ADDRESS-STENCIL PRINTING MACHINE
Gert Saeger, Hamburg-Lemsahl, Germany, assignor to
John H. Stielow, Hamburg, Germany
Filed May 7, 1964, Ser. No. 365,625
Claims priority, application Switzerland, May 13, 1963,
6,063/63
12 Claims. (Cl. 101—48)

This invention relates to a printing machine, for example, for addressing with information printing plates such as stencils, which has a collection magazine for collecting the plates and a delivery magazine which has an associated delivery plate slide, this slide being arranged to transport individual plates or stencils from the delivery magazine along a guide into the area of operation of a printing ram.

Such machines work with a so-called ejector and a so-called "sheet guide," and have means forming a path along which the plates are transported. The ejector is set only if an impression is made on a page or on a sheet and if the page or sheet is then carried away. The sheet guide thus serves to move sheets to be printed in a step-by-step manner, so that impressions can be made at different positions on the sheet. Known machines have different driving devices for the ejector and for the sheet guide. In particular, known sheet guides have arms and rack devices which automatically must have a stroke equal to the length of the largest sheet to be printed, and which even for smaller sheets nevertheless perform a complete reciprocating movement over the whole length of the stroke. The known devices thus require grips for the individual pages or sheets. Also, these grips represent a basic disadvantage since they are expensive and troublesome.

A further basic problem is posed by the collection magazine, since the control element for a wheel corresponding to one particular thickness of printing plate is strongly stressed, with the result that the precision decreases by a considerable amount in accordance with the speed of operation.

A further problem in such machines concerns the supply of printing plates or stencils from a vertically movable stack or pile of such plates. In such a pile it is necessary for only the lowest printing plate to be moved away at any one time. The slide which is necessary for this must engage only the front edge of the under side of the lowest printing plate in order to convey the plate away. Furthermore, this form of control requires not only a very high working speed but also a comparatively high precision.

Inasmuch as a rigid mechanical connection with the drive mechanism is provided, this results in the disadvantage that damage can be caused to the printing plates if there is any obstruction to movement of the plates during the working cycle, such binding or obstruction being possible with known rigid guides.

The present invention is concerned with overcoming these disadvantages and with providing a printing or addressing machine which has a high working speed and a combination of different new features, and which is distinguished by its safety of operation. This is achieved by combining a guide for the work to be printed with an ejector arrangement, whereby a roller arrangement is freely engageable through a clutch with a continuously energized main drive for the ejector device. A free-running clutch is provided for the roller arrangement, and is effective to advance the rollers in only one rotational direction, this free wheel being driveable in the positive driving direction according to the adjustable stroke of the sheet guide.

In particular, a combined sheet guide and ejector arrangement is provided in which the above-mentioned roller arrangement is preferably engageable through a magnetic clutch on the main drive shaft.

Thus, the feed rollers are preferably provided on a shaft which is coupled to a coupling arrangement which has two driving wheels, one of which is engageable with the shaft by means of an electromagnet and the other of which is in positive driving connection with the shaft through a free wheel, this positive driving connection permitting free rotation of the rollers by rotation of said one driving wheel. A control wheel is also preferably provided for adjusting the stepped advance or feed stroke of the sheet guide, the position of the control wheel being sensed by a sensing roller, with the delivery position of the roller lying on a diameter of the control wheel which itself extends perpendicular to the axis of rotation of the roller.

The control wheel has a further advantage since the velocity curve, in practice, begins tangentially to zero velocity and, by way of gradual velocity increases, ends in a similar tangential direction, so that for each stroke a characteristic movement is produced which avoids the disadvantageous influences of acceleration. The sensing roller can suitably be connected to a pivoted lever which is coupled to the second driving wheel by a chain. The end of the chain is preferably with a spring which brings about the return stroke of the roller to the control wheel and which holds the control wheel against the roller.

Furthermore, in accordance with the invention, a control cam is arranged substantially concentrically about the axis of the control wheel, this control cam guiding counterpressure rollers associated with the driving rollers in dependence on the stroke of the sheet guide on the driving rollers.

In the embodiment of the printing machine which is provided in accordance with the invention with a stepped action for a carrier plate for the collection pile of plates, a spindle is provided as a reference element on the collection magazine at the end of the guide for the printing plates. This spindle is arranged to co-operate with a double-armed escapement pawl linked to a lifting table, the pawl having two teeth which are separated from one another by a whole multiple of the screw pitch of the spindle plus one half of this pitch and being movable in a reciprocating manner under the influence of an electromagnet. Thus, the electromagnet and pawl arrangement can be pivotally mounted on a lifting table and can be held coupled by means of a spring on an adjustable extension member. This has the advantages that the pawl is held at a distance from the spindle, and that upon disengagement of one tooth, the other tooth engages the screw-thread located between them, whereby one tooth is freed from the screw-thread of the spindle as the latter is engaged by the other tooth. In this manner, the device can be extensively used, without causing wear, and accuracy over long periods of time is always ensured for the reference element if the spindle is rotatably arranged in this advantageous manner.

Further advantages of the invention will become apparent from the following detailed description of one embodiment according to the invention and from the accompanying drawings in which only the parts relevant to the subject of this application are represented.

Figure 1:
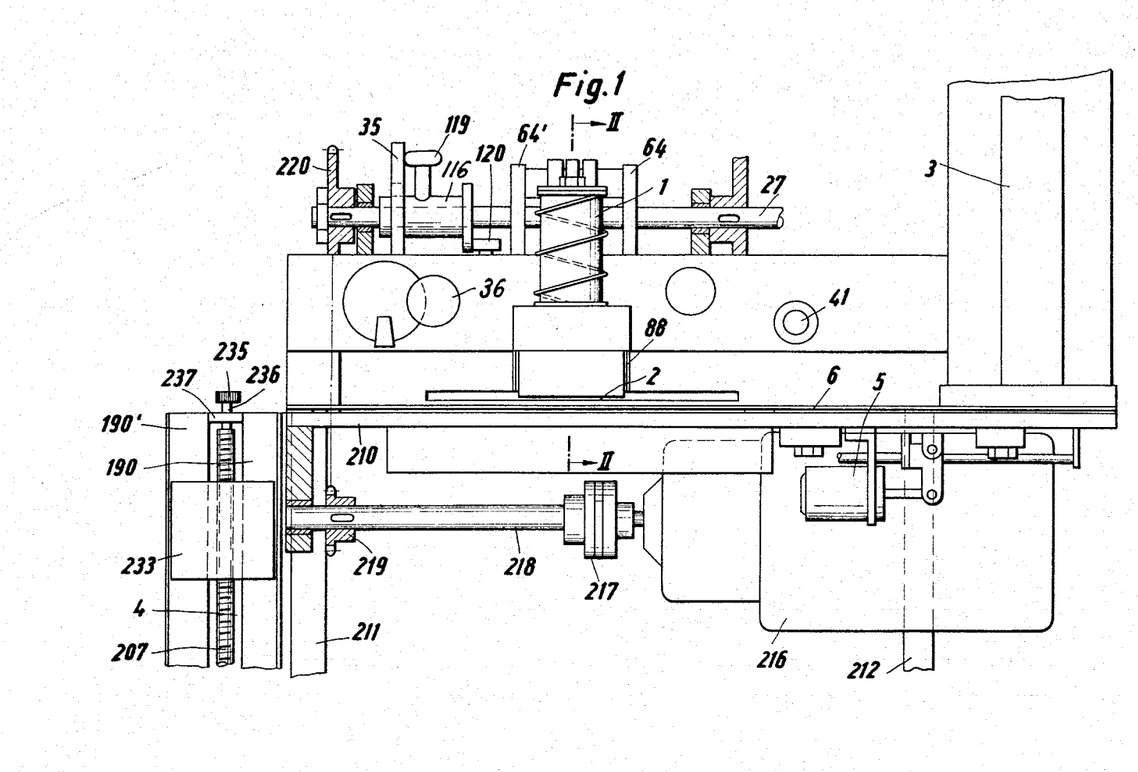
FIG. 1 is a schematic front elevation view of a printing machine showing the diagrammatic arrangement of the individual parts; the machine is shown partly in section, with other parts, which are not essential to the invention or which are shown more clearly in other figures, not shown clearly in this figure.
Figure 2:
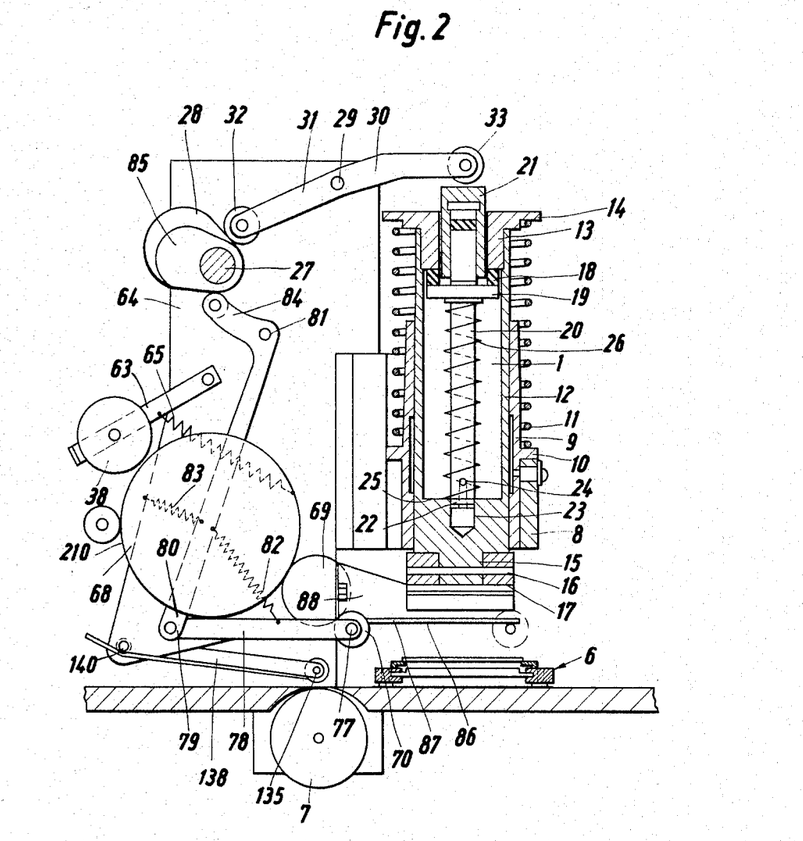
FIG. 2 is a section taken along the line II—II of FIG. 1.
Figure 3:
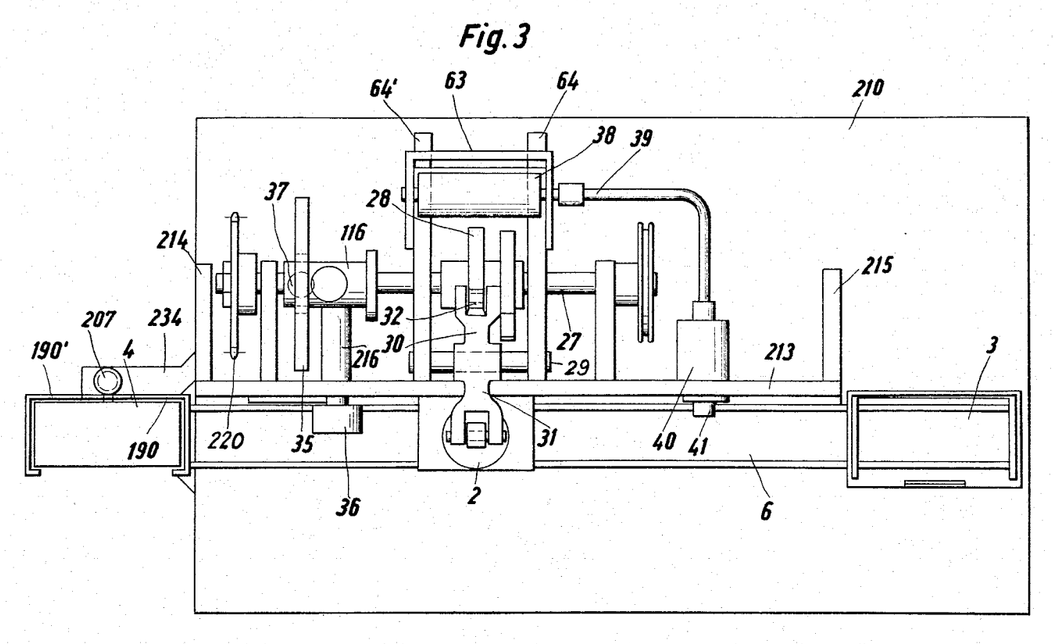
FIG. 3 is a top plan view of the arrangement of FIGS. 1 and 2.

FIGS. 1 to 3 show clearly the mutual relationship of the parts in the general structure of the machine. From these figures it will be seen that the framework has a base plate 210. Two support legs 211, 212 extend downwardly from this base plate and serve to support the machine. Furthermore, supports for the different shafts are provided on the base plate 210 or on the connecting framework elements and other parts are also connected thereto.

In particular, it will be seen from FIG. 3 that an upwardly extending framework wall 213 is provided which has support extensions 214, 215 and in particular the central support extensions 64, 64', extending at right-angles to the wall and to the base plate 210. Moreover, it will be seen from FIG. 1 that a driving unit 216, for example, consisting of an electric motor and an associated drive, is fixed beneath the base plate 210.

The output shaft of motor 216 is coupled through a clutch 217 with a main driving shaft 218 which carries a sprocket 219. A transmission, such as a chain, extending through apertures in the base plate 210 connects sprocket 219 with a driving sprocket 220 on a shaft 27 whose function will be described later. The transmission extends behind the wall 213 of the framework.

The machine as shown in FIG. 2 includes a printing ram 1 having a printing pad 17 arranged adjacent to its lower end. Moreover, a delivery magazine 3 and a collection magazine 4 (FIG. 1) are provided with an ejector arrangement which is actuated by an electromagnet 5. Individual printing plates 189 (FIG. 12) are transferred from the delivery magazine 3 into a guide 6 by means of a delivery slide and, after travelling along this guide, are received in the collection magazine 4 (FIGS. 1 and 2). A carrier plate 188 (FIG. 12) is provided in the collection magazine and this carrier plate is movable in a stepped manner which is governed by the working cycle of the machine and of the printing ram 1.

The printing ram 1 is associated with an inking device. It will thus be seen that the printing plates 189 (FIG. 12) are carried from the delivery magazine 3 in the guide 6 by means of an ejector 159 (FIG. 10) in a stepped manner to the collection magazine 4. The printing ram 1 is able to make the necessary impression during its working cycle, and a transport or feed roller arrangement 7 (FIG. 2) then ensures that the sheet or page to be printed is carried across the guide path for the printing plates 173, 174, under the guide 6.

The printing ram 1 (FIG. 2) is arranged in a guide housing 8 which is fixed to the framework, and in which is seated a guide sleeve 9 which has a flange 10 extending outwardly therefrom. This flange serves as the lower seat for a spring 11. A housing tube 12 for the ram is telescopically movable in the guide sleeve 9. A guide plug 13 having an outwardly projecting flange 14 is provided at the upper end of the housing tube 12, the flange 14 forming the upper seat for the spring 11.

The housing tube 12 is closed at its lower end and carries the printing pad 17 on an extension 15 by means of a pivot pin 16, the lower side of the printing pad 17 being arranged to be inked. The internal structure of the printing ram is not described in detail. It has the purpose of providing a certain elasticity which is advantageous for the vertical movement of the ram at a high operating speed.

The main driving shaft 27 of the machine is provided with a cam 28 for operating the printing ram. Furthermore, a lever with two arms 30, 31 is mounted in the framework and is pivotable about a shaft 29, the arms 30, 31 carrying rollers 33, 32 at their respective ends. The roller 32 rests on the cam 28 while the roller 33 rests on the upper surface of a printing support 21 in order to force the ram 20 downwards in response to a rotation of the levers 30, 31 in a clockwise manner.

FIG. 3 shows the inter-relationship of the parts shown in FIGS. 1 and 2. From FIG. 3 it can be seen that the main driving shaft 27 is continuously driven through driving sprocket. Around the shaft 27 is fitted a control wheel 35 which is to be described later and which is adjustable by means of an adjusting knob 36 (see also FIG. 6), in a manner which will also be described later, about a shaft 113 (FIG. 6) arranged perpendicular to the plane of the drawing of FIG. 3.

An ink drum 38 is provided and is supplied with ink by a flexible tube 39 and a pump arrangement 40 which is controlled by a control knob 41.

The ink drum 38 is also illustrated in FIG. 2. The drum 38 is mounted on a lever 63 which is pivoted to the framework 64, and drum 38 is pressed against a transfer drum 68 by means of a spring 65. This transfer drum 68 rests against a second transfer drum 69 which co-operates with a roller 70 to cause inking thereof. This inked roller 70 is rotatably mounted on a shaft 77 which is mounted in levers 78, one of which is shown in FIG. 2. The levers 78 are articulated with guide levers 80 through a pivot 79, the guide levers 80 also being rotatable about a pivot 81 fixed to the framework 64. A tension spring 82 connects the lever 78 with the guide lever 80. A further spring 83, which is secured to the framework 64, is also connected to the guide lever 80, this spring 83 pressing a projection 84 of the guide lever 80 against a cam 85. This cam is arranged on the main driving shaft 27 and ensures that the inked roller 70 is led along to the printing pad 17. For the purpose, a guide 86 is provided for the shaft 77. This guide 86 is formed by the lower edges of two guide plates 88 provided one on each side of the printing ram 1 and extends substantially at right-angles to the direction of movement of the printing ram 1. By means of this linear guide 86 for the inked roller 70 a device for inking the printing pad is produced which has a high speed of operation.

A special part of the printing machine is the so-called sheet guide which ensures that feeding of the sheets to be printed is carried out as a result of the continual stepped movement following each printing operation. Known sheet guides have a traction arm for the sheets, and rack devices which are movable in a stepped manner by means of pinions and a comparatively complex gear system.

It is evident that the connecting rods must have a stroke of a length corresponding to that of any sheet, in order to ensure a stroke over a distance corresponding to the length of any such sheet. The length of the connecting rods is thus determined by the greatest length of a sheet which may possibly be used, with the result that the dimensions of the machine are unfavorably affected, especially as the maximum stroke length is not always fully utilized. The corresponding necessary gear systems are extremely complex.

The embodiment of the present invention, on the other hand, uses an electromagnetically operated wedge gear in combination with a one-way clutch, so that the sheet transport rollers are connectable in a selected manner to a continuously rotating drive or are drivable in one direction in a stepped manner, and, depending upon the clutching action or the drive movement used, either a smooth movement or a stepped movement of the sheet is brought about. The stepped feed can be arranged to operate as often as is required, so that any length of sheet can be used without any discharged part dependent upon the length of the sheet being necessary in this connection.

Counter-pressure rollers are also provided which are controllable by means of cams and are arranged in cooperative relationship with the feed device which is controlled by the wedge gear or the one-way clutch. The control cams are controlled by the ejector mechanism so that a positive drive occurs only as a result of a printing operation and after removal of the sheet. Thus, the counter-pressure rollers are brought into engagement with the transport or feed rollers in a timed or cyclic manner. Near the sheet guide, on the other hand, the counter-pressure rollers are always located in the region of the transport or feed rollers.

Figure 4:
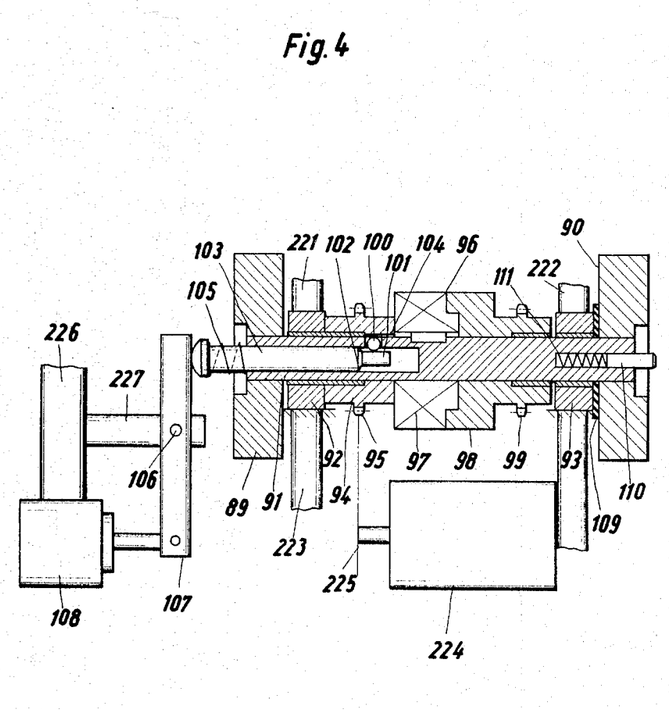
FIG. 4 shows the arrangement of the transport roller mechanism shown in FIG. 2, with the roller control mechanism shown in section.

FIG. 4 shows the feed roller arrangement 7 (FIG. 2) which consists of two feed rollers 89, 90. These rollers are fixed on a shaft 91 mounted in its framework, and the support bearings are indicated by references 92 and 93. The framework elements are indicated respectively at 221 and 222, and are connected to the lifting table 210.

It will be seen that frame elements 223 extend downwardly from bearing blocks 92, 93 and support a driving motor 224 which can drive a drive sprocket wheel 95, which will be described later, through the transmission 225 if the motor 224 is operating.

A sleeve or hub 94 carrying a drive sprocket 95 is rotatable on the shaft 91. Moreover, a one-way clutch 96 is also located on the shaft 91, the two halves of the clutch being indicated at 97 and 98, and the half 97 being fixedly connected for rotation with the shaft 91. The half 98 of the clutch is freely rotatable in one direction but in the other direction is coupled with the half 97 of the clutch and drives the shaft 91 by means of a driving sprocket 99.

The driving sprocket wheel 95 can be connected, in a manner not shown, through a further transmission device with the continuously rotating main driving shaft 27 (FIG. 3) of the machine. Coupling of sprocket 95 with the shaft 91 is made possible by a coupling element 100 in the form of a ball which can be pressed into a bore or recess 104 in sleeve or hub 94 by means of a pin 101 and a conical surface 102 of a piston 103. The piston 103 can be moved in opposition to a spring 105 by means of a double-armed lever 107 controlled through an electromagnet 108, the lever 107 being rotatable about a shaft 106 fixed to the framework, in order to insert the coupling element 100 in the ejector mechanism and to couple sprocket 95 with the shaft 91, thus continuously driving the feed rollers 89, 90. Electromagnet 108 is connected with the base plate 210 by means of a support arrangement 226. This support arrangement also carries a support arm 227 for the shaft 106.

The clutch which makes use of the coupling element 100 is disengaged by the so-called sheet guide, i.e. electromagnet 108 is not energised. The feed rollers 89, 90 are then freely rotatable with the shaft 91. If an oscillating movement is now imparted to driving wheel 99 in its direction of rotation, then the shaft 91 and the feed rollers 89, 90 will be rotated in one direction and will be held stationary in the other direction. A braking disc 109 is provided between the roller 90 and bearing block 93, this disc being pressed against the roller 90 and the support rod 93 by means of a peg 110 which is displaceable in opposition to the power of a spring 111, so as to ensure that the feed rollers 89, 90 are kept stationary in the one direction of rotation of the driving wheel 99.

Now that the continuous drive through the driving sprocket 95 has been explained, the reciprocating rotary movement of the driving sprocket 99 on the sheet guide will now be described in detail with reference to FIGS. 3, 5, 6 and 7.

Figure 5:
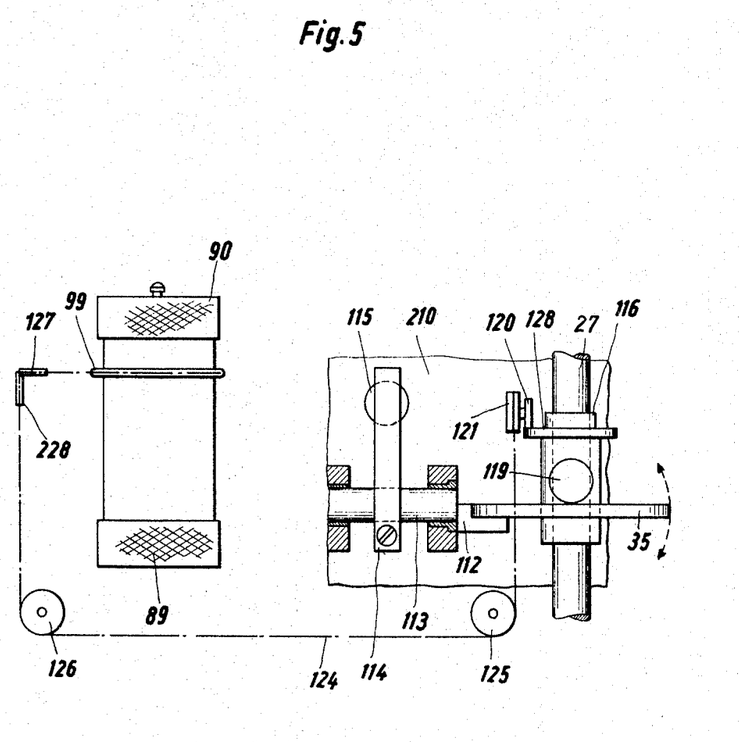
FIGS. 5 and 6 show diagrammatic views of the control arrangement for the sheet guide, with the control wheel shown in plan view and in side elevation respectively.
Figure 6:
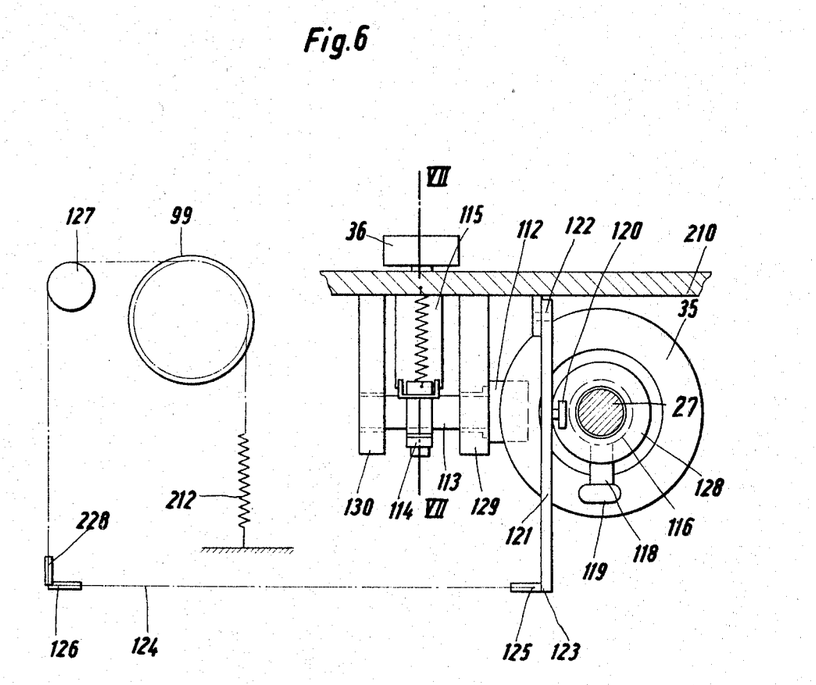
Figure 7:
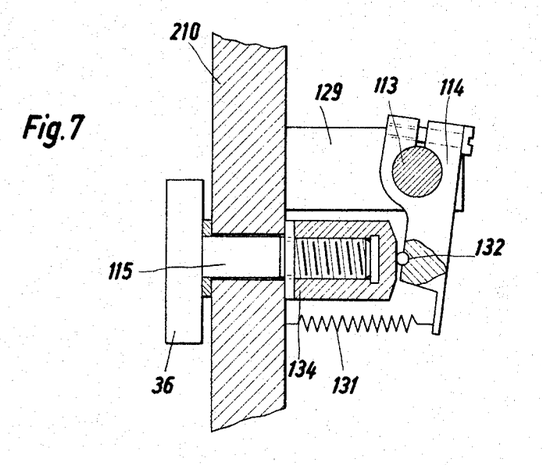
FIG. 7 shows a sectional side view of FIG. 6, taken along the line VII—VII of FIG. 5 and showing the adjusting device for the control wheel.

The control wheel 35 is cooperable with a rotatable shaft 113 by means of an intermediate cam member 112 (FIGS. 5 and 6), this shaft 113 being mounted in the framework (FIG. 7). A pivoted lever 114 is secured to this rotatable shaft 113, and is moveable by means of a thumb-screw 115 for adjusting the stroke (FIG. 7). The thumb-screw 115 is adjustable by means of an adjusting knob 36 (FIGS. 3 and 5–7). In FIG. 3 the connection means between the adjusting knob 36 and the control wheel arrangement are indicated generally at 216, while the individual parts are shown clearly in FIGS. 5–7.

The control wheel 35 is formed as an annular disc. This is pivotably mounted, like an oscillating ball-bearing, for oscillation about the axis of a pin 37 extending diametrically relative to 116 which is displaceable axially along main driving shaft 27 in the preferred embodiment. It is also seen, in particular in FIG. 3, that the casing 116 is arranged in the described manner on the shaft 27, i.e. by known means which are rotatably fixed but axially displaceable. These means which are not shown in detail can, for example, consist of a spline or key engaged in a slot. A sensing roller 119 is mounted on the sleeve 116 by means of a radial arm 118, the sensing roller 119 running around the control wheel since the sleeve or hub 116 is arranged for fixed rotation on the shaft 27 which is driven with the main drive of the machine. Sleeve 116 carries a flange 128 for engagement by a driving roller 120 (FIGS. 5, 6) which is rotatably mounted on a lever 121 which is pivotted at 122 to the framework of the machine, for example, to the framework wall 210. It is thus evident that by inclining the control wheel 35 by angular displacement of the shaft 113, the driving roller 120 causes an oscillatory motion of the lever 121. Since a chain 124 is secured to the free end 123 of the lever 121 (FIGS. 5 and 6), this chain passing over the rollers 125, 126, 127, 228, the chain 124 is moved in a reciprocating manner corresponding to the oscillatory movement of the lever 121 which is governed by the inclined position of the control wheel 35 through the corresponding positioning of the shaft 113. The rollers, 125, 126, 127, 228 are fixed in their supports on the framework of the machine in a manner which is not shown in detail. Reference is also made to FIG. 5 which shows parts of the framework, such as the base plate 210. The chain 124 passes around the roller 127 and around the sprocket 99 (FIG. 4) and is connected on the other side of the driving wheel 99 to a spring 212 (FIG. 6). The spring 212 is extended by a forward movement of the lever 121 and is rleaxed by the return movement of the lever. Thus, the driving wheel 997 is rotated back and forth.

As will be noted, the stroke of the reciprocating movement of the chain 124 depends on the size of the stroke of sleeve 116 axially of the shaft 27. This reciprocating movement is caused through the corresponding inclined position of the control wheel 35. It will be seen that the neutral position of the sensing roller 119 lies in a direction which is at right angles to the rotatable shaft 113. This ensures that, in the movement of the chain 124 and, in particular, in the driving movement of the feed rollers 89, 90, a gradual increase in the velocity is attained since the magnitude of the stroke depends on the inclined position of the control wheel 35, but in the region of the change-over of the stroke the velocity curve has a gradient which gradually approaches that of zero velocity and then increases again when a movement in the opposite direction takes place. The characteristic movement essentially follows a sinusoidal curve. This is mentioned at this point since it is an essential condition in order to achieve a high working speed with a reduction in the oscillations in the driving arrangement. The rotatable shaft 113 is rotatably mounted in brackets 129, 130. The rotatable shaft 113 is in fixed connection with the lever 114. This lever 114 is pressed against a casing 134 by means of a spring 131 and through a pressure bearing 132. The casing 134 is adjustable by means of the thumb-screw 115 and the adjusting knob 36.

Figure 8:
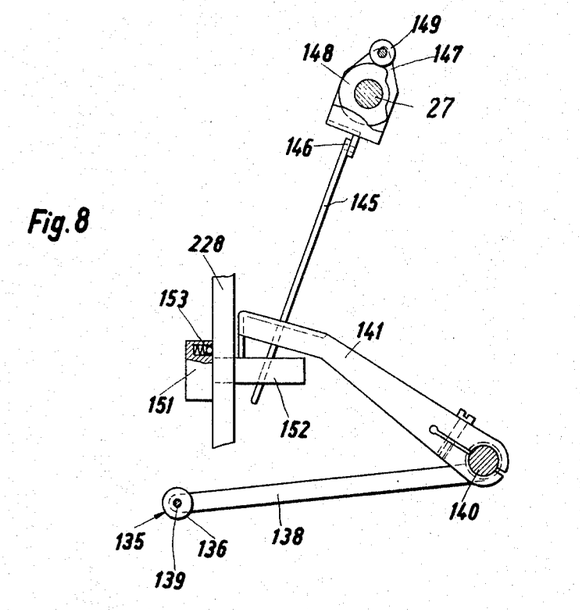
FIGS. 8 and 9 show views, relatively displaced respectively through 90°, showing more clearly the connecting rods between the control cams for the counterpressure rollers.
Figure 9:
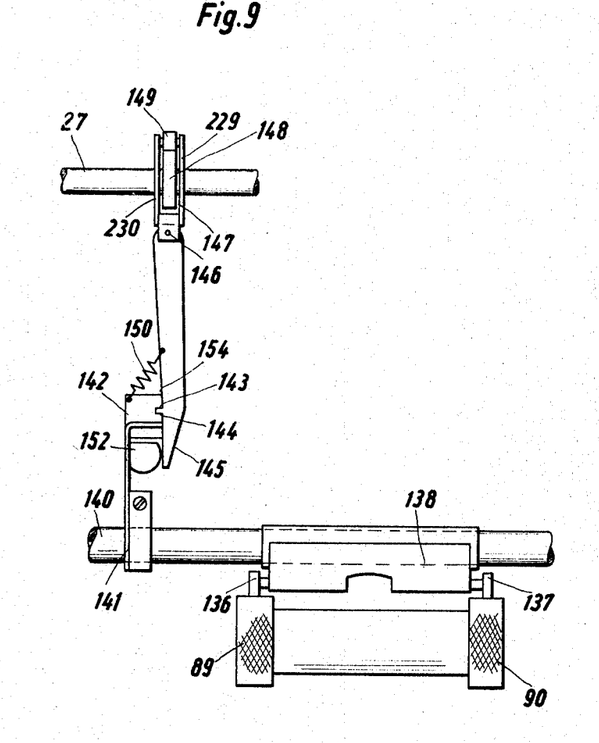

The feed roller arrangement 7 consisting of feed rollers 89, 90 is associated with the counter-pressure roller arrangement 135 having counter-pressure rollers 136, 137, as is shown in FIGS. 8 and 9. This counter-pressure roller arrangement 135 is fitted on pivoted lever 138 in which one end of each stub shaft 139 for the counter-pressure rollers 136, 137 is arranged. Lever 138 is pivotable about the axis of a shaft 140 to which is fixed a pivotable operating lever 141. The shaft 140 is mounted in the parts 64, 64' of the framework, as seen in FIG. 3. This pivotable operating lever 141 has a lateral right angle flange or bracket 142 with a notch 143 therein. A projection 144 on a coupling lever 145 is arranged to engage this notch, and the coupling lever 145 is mounted for pivotable movement about a pivot 146 located on a carrier 147 which surrounds a cam 148 on the shaft 27 and carries a cam rider 149. As is evident from FIG. 9, the side walls 229, 230 of the carrier are provided with apertures through which shaft 27 projects, so that the carrier is mounted concentrically about the shaft 117. The coupling lever 145 and the operating lever 141 are biased together, with the projection 144 in the notch 143, by means of a spring 150. The cam 148, whose shaft 27 is rotatably driven from the main drive together with the sensing roller 119, moves together with the counter-pressure rollers 136, 137 in the same operation cycle as the feed roller arrangement 7, while the sheet guide is pressed against the feed rollers 89, 90 when the counter-pressure rollers 136, 137 are at the position for an advance or feed stroke. An adjusting knob 151 is rotatably connected to an eccentric cam 152 and can be held by stop means 153 in a fixed position in the framework. The adjusting knob 151 is, for example, fixed in a wall 228 of the casing running behind and parallel to the wall 213 of the framework, the back wall 228 being only partly shown in FIG. 8 and extending parallel to the plane of the diagram in FIG. 9.

The coupling lever 145 is pivotable by adjustment of the cam 152 so that there is gripping engagement between it and the pivoted lever 141, whereby the pivoted lever 141 is operated and the counter-pressure rollers 136, 137 are withdrawn from the feed rollers 89, 90.

Figure 10:
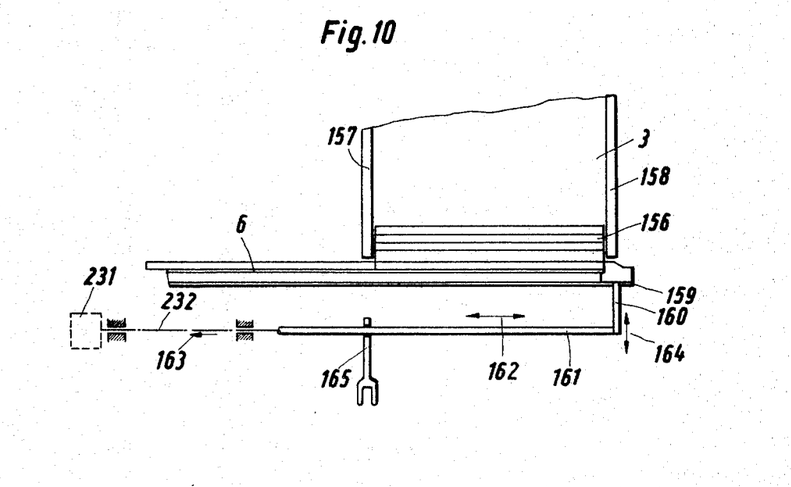
FIG. 10 is a schematic side view of the ejector cam arrangement.
Figure 11:
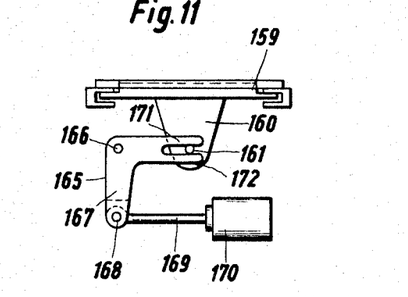
FIG. 11 is a front elevation view of FIG. 10.

In FIGS. 10 and 11 is shown the delivery magazine previously described with reference to FIGS. 1 to 3, in which printing plates 189 are arranged which are pushed into the guide 6. An ejector cam 159, indicated as a slide, has reciprocating movement below the edges of the side walls 157 and 158 of the magazine 3. Cam 159 has an arm 160 which is moveable back and forth in the direction of the arrow 162 by means of a rod 161. This rod 161 is fixedly guided in its raised position when moving in the direction of the arrow 163, and is elastically secured, for oscillation in the direction of the arrow 164, on the end of the arm 160. It will be obvious that the rod 161 is moveable in an oscillating manner in the direction of the arrow 164, for example, by means of an electromagnet (not shown). In the previous case, the electromagnet serves only to increase the height adjustability of the ejector cam 159. For completeness however, an electromagnet 231 for causing the reciprocating movement is represented on the chain-dotted extension 232 of the rod 161. Intermediate its ends, the rod is displaceably held parallel to the longitudinal axis through its supports in a pivoted lever 165. The lever 165 is pivotable about a pivot 166 which is fixed to the framework, and is formed as a bell crank with the lower arm 167 connected to an operating rod 169 of an electromagnet 170 through a pivot 168. The arm 171 has a slot 172 which grips the rod 161 and moves it either upwardly or downwardly depending on whether the electromagnet 170 is energized or not.

Thus, the ejector cam 159 is moved either upwardly or downwardly in accord with the simultaneous movement of the rod 161. This form of control is such that the cam 159, on its return movement in the direction of the arrow 162, is displaced to the right, below the printed plates 189, in its raised position, so that the entire pile of printed plates 189 is displaced upwardly and is then moved down again when the ejector cam 159, having the profile shown in FIG. 10, reaches the extreme right-hand limit position indicated in FIG. 10. The printed plates 189 are loosened from one another by means of the resultant vibration. In this manner the electromagnetic control for these parts by means of the electromagnet 170 turns out to be extremely advantageous.

Figure 12:
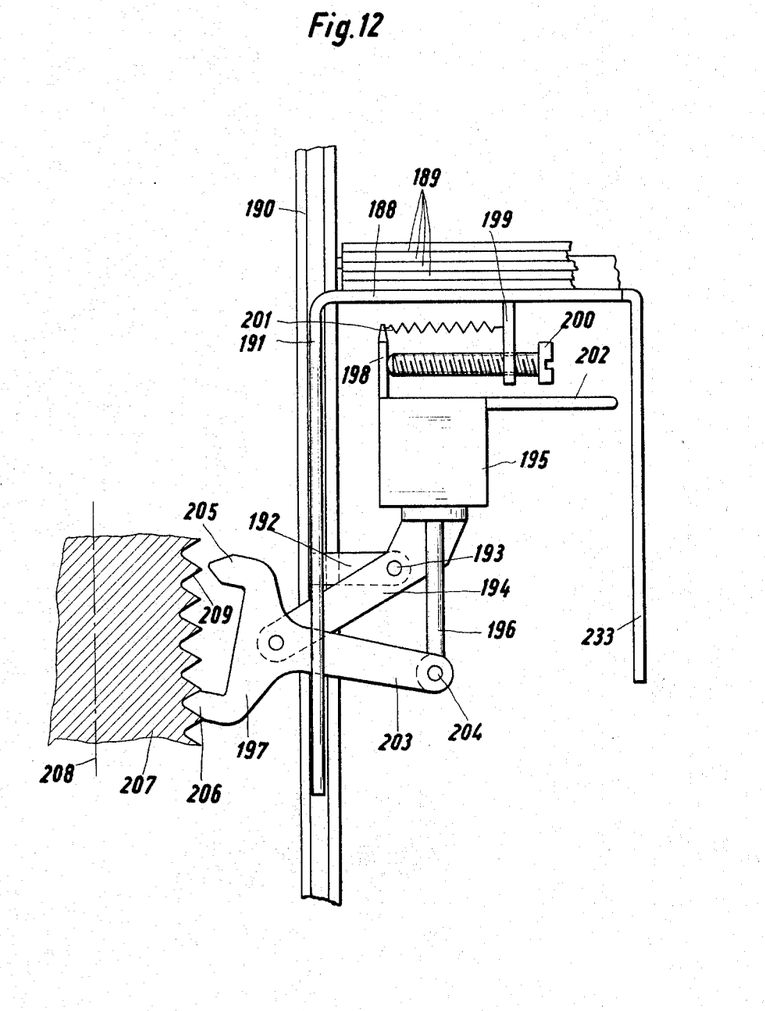
FIG. 12 is a partial elevation view, partly in section, of the support arrangement for the collection magazine.

FIG. 12 shows a schematic view of the arrangement for supporting a carrier plate 118 of the collection magazine 4. On this carrier plate is preferably arranged the front face 233, which is shown in FIG. 1. The carrier plate is indicated by the reference 188. The printing plates 189, transported from the delivery magazine 3 through the guide 6, rest on the carrier plate 188. The carrier plate 188 is fitted between the side walls 190 of the collection magazine 4. Only one side wall 190 is shown in FIG. 12. Referring to FIG. 1 it will be seen that the construction of the carrier plate can also be closed in front by a corresponding wall structure. The wall 190 is omitted to the depth of the guide 6.

According to FIG. 12, the edges of the side wall sections 190, 190' have a U-shaped profile which provides a guide path for the wall 191 of the carrier plate 188. A bracket 192 with a pivot 193 is fixed in this wall 191. A double-armed pivot lever 194 is pivoted on pivot 193, the lever 194 carrying an electromagnet 195 at one end and a pivot for a double-armed escapement pawl 197 at its other end. An abutment 198 is formed on the electromagnet 195, and an abutment 199 is also formed on the carrier plate 188. An adjustable screw 200 is arranged between these abutments. A tension spring 201 extends between the abutments 198 and 199 and enables the electromagnet 195 and the lever 194 to be pivoted by means of a hand grip 202 about the pivot peg 193 in an anti-clockwise sense, while biasing those in the clockwise sense with reference to the abutments 198, 199 according to the position of the screw 200. The pawl 197 is secured to a rod 196 of the electromagnet 195 by means of an arm 203 and a pivot 204, the electromagnet 195 being able to pivot the pawl 197 about its pivot. The pawl 197 has two teeth 205, 206. A spindle 207 (FIGS. 1, 3 and 12) is mounted in the framework for rotation about its axis 208. The support extension 234 is shown in FIG. 3 while FIG. 12 only shows a cross-section of the spindle in its relationship to the carrier plate arrangement. The spindle is oriented vertically behind the opening between the wall portions 190, 190'. In particular, an axial extension of the spindle with a rotatable knob 235 is shown in FIG. 1, the knob 235 making an adjusting movement possible. Preferably, the extension 236 of spindle 207 is axially fixed in a bearing support 237, while the bearing support 234 shown in FIG. 3 receives the lower end of the spindle. The thread of the spindle 207 is clearly illustrated, and it can be seen that the teeth 205, 206 are separated from one another by a distance which corresponds to a complete multiple of the pitch of the spindle thread plus one half of this pitch. If the tooth 206 of the pawl 197 engages the screw-thread of the spindle 207, the tooth 205 is located over the apex of a further thread of the screw.

If the electromagnet 195 is energized in the position in which it is shown in FIG. 12, the tooth 206 moves out of engagement and causes the subsequent displacement of the parts of the pawl 197 and the spindle 207 thus causing lowering of the carrier plate 188 and simultaneously causing the tooth 205 to move into engagement with a groove 209 in the thread of the spindle 207, so that the carrier plate 188 moves down around the ascending thread of the spindle 207. By deenergizing the electromagnet 195 a corresponding step results, so that it is seen that a stepped mode of operation takes place both upon energizing the electromagnet 195 and upon deenergizing the latter.

The use of a spindle 207 as the reference element for the control of the movement of the carrier plate is extremely advantageous, not only because the spindle 207 is comparatively easy to manufacture, but also since, because of its capacity for rotation, a reserve of unused screw thread for the teeth 205, 206 always remains, so that accuracy in the working process is ensured and a longer working life of the machine is guaranteed.

If the carrier plate 188 is displaced upwardly the hand grip 202 is displaced against the bias of the spring 201. Thus, the escapement pawl 197 pivots about the peg 193 by means of the lever 194, so that both teeth 205, 206 of the pawl 197 are brought out of engagement with the spindle 207.

The embodiment hereinbefore described shows one particularly advantageous solution of the problems, in which, if the spindle 207 is adjustable in a nut, any rest position of the carrier plate 188 can be very finely adjusted by means of the pawl 197 and the spindle 207.

I claim:

1. A printing machine for printing information on initially stacked individual substantially flat printing plates, such as stencils, said machine comprising, in combination, a frame having means forming a working surface; plate guide means extending longitudinally above said surface; a delivery magazine, for stacked plates, at one end of said guide means; a receiving magazine, for stacked plates, at the other end of said guide means; cyclically operable plate transport means reciprocable along said guide means to engage the bottom plate in said delivery magazine and move it along said guide means toward said receiving magazine; a printing ram positioned along said guide means at a printing zone intermediate the ends of the latter and reciprocable perpendicularly to said surface to engage plates in said zone of said guide means; driving means operable to reciprocate said ram; work guide means operable to feed the work along said surface transversely beneath said plate guide means at said zone for printing on the work, by said ram, the information on a plate then positioned in said printing zone; a main drive system continuously energized during operation of the machine; first transmission means connecting said main drive system to said plate transport means and to said ram driving means; said work guide means including roller means rotatably mounted on said frame and operatively engaged with work in said work guide means to advance the work towards said zone, a one-way clutch including a driven member, fixed to rotate with said roller means, and a driving member, reciprocable transmission means connected to said driving member to oscillate the latter, means connecting said reciprocable transmission means to said main drive system and operable to reciprocate said reciprocable transmission means, an adjustable control means on said frame and operatively connected to said reciprocable transmission means to adjust the stroke thereof, a second driving member rotatably mounted coaxially with said roller means, third transmission means connecting said second driving members to said drive system to rotate said second driving member, and coupling means selectively operable to couple said second driving member with such clutch driven member.

2. A printing machine, as claimed in claim 1, in which said roller arrangement includes a shaft; means rotatably mounting said shaft on said frame; a pair of feed rollers fixed to said shaft to rotate therewith; said first mentioned driving member and said second driving member being rotatably mounted on said shaft; said driven member being fixed to rotate with said shaft; said shaft having an axial bore extending partly therethrough from one end thereof; said coupling means including a pin positioned in said bore for axial displacement therealong; a coupling element mounted in a radial bore in said shaft and engaged with said pin, said coupling element being displaceable partly out of said radial bore and into engagement with a recess in the inner surface of said second driving member; said pin being formed to displace said coupling element radially outwardly upon axially inward movement of said pin; and means operatively engaged with the outer end of said pin and selectively operable to displace said pin axially inwardly along said bore; said clutch driven member, upon oscillation of said first mentioned driving member, rotating said pair of feed rollers in a direction to feed the work toward said zone upon rotation of said first mentioned driving member in one angular direction, and remaining stationary when said first mentioned driving member is rotated in the opposite angular direction; whereby said feed rollers are freely rotatably in said one angular direction.

3. A printing machine, as claimed in claim 1, said main drive system including a main drive shaft rotatably mounted in said frame; an annular control disc surrounding said main drive shaft and mounted for oscillation about an axis extending diametrically of said main drive shaft and with respect to said main drive shaft; whereby said control disc is angularly adjustable relative to the axis of said main drive shaft; a sleeve rotatable with said main drive shaft and axially movable therealong; a sensing roller mounted on said sleeve for rotation about an axis extending radially outwardly of said sleeve, said sensing roller being engaged with a side surface of said control disc; a relatively elongated feeler pivotally mounted on said frame and engageable with said sleeve at a point spaced from its pivot for oscillatory movement in accordance with axial reciprocation of said sleeve; said reciprocable transmission means being connected at one end to the free end of said feeler and, at the other end, to said first mentioned driving member, whereby the amplitude of oscillation of said first mentioned driving member corresponds to the amplitude of oscillation of said feeler by axial reciprocation of said sleeve; said adjustable control means controlling the angular position of said control disc relative to a diametric plane through said main drive shaft whereby to control, through said sensing roller, the amplitude of axial reciprocation of said sleeve.

4. A printing machine, as claimed in claim 3, in which said adjustable control means comprises a shaft mounted for angular adjustment in said frame and having an axis extending perpendicular to said main drive shaft, and a cam on said last-named shaft engageable with said control disc; the axis of rotation of said sensing roller, in the neutral position thereof, extending perpendicular to the axis of said second-mentioned shaft.

5. A printing machine, as claimed in claim 3, in which said reciprocable transmission means includes a chain connected at one end of said oscillating feeler, trained over a sprocket on said first-mentioned driving member and connected at its opposite end to one end of a spring secured to said frame; said spring effecting return movement of said chain and maintaining said sensing roller engaged with said control disc.

6. A printing machine, as claimed in claim 3, including counter-pressure rollers operatively associated with said roller means and engaged with the surface of the work opposite to that engaged by said roller means; a lever pivotally mounted in said frame; said counter-pressure rollers being rotatably mounted in the free end of said lever about an axis parallel to the pivot axis of said lever; an operating arm secured to oscillate with said lever; and extension control means operatively associated with said operating arm to move said counter pressure rollers into and out of operative relation with the work, said extension control means including a cam fixed on said main drive shaft and operating said counter-pressure rollers in accordance with the operation of said work guide means and in the same time cycle as the oscillation of said feed rollers.

7. A printing machine, as claimed in claim 6, said extension control means including a connecting rod having a cam follower engaged with said cam; said connecting rod being engageable with said operating arm; and an adjustment cam mounted on said frame work and engaged with said rod, said adjustment cam having a first position disconnecting said connecting rod from said operating arm and a second position connecting said connecting rod to said operating arm.

8. A printing machine, as claimed in claim 1, in which said transport means includes an ejector reciprocable longitudinally of said guide means to move printing plates along said guide means; an elongated rod-like member reciprocable longitudinally of said guide means and connected at one end to said ejector; operating means connected to the other end of said rod-like member to reciprocate the same; said one end of said rod-like member being adjustable toward and way from said guide means to adjust said ejector relative to said guide means; a bell crank lever pivotally mounted on said frame work intermediate the ends of said rod-like member, and having a forked-arm embracing said rod-like member; and electromagnetic means having a movable member connected to the other arm of said bell crank lever and operable to oscillate said bell crank lever in a manner to control the position of said rod-like member relative to said guide means such that said ejector, upon its return movement, lifts the stack of plates in said delivery magazine and then drops the stack of plates.

9. A printing machine, as claimed in claim 1, said receiving magazine having side walls mounted on said frame work; a carrier displaceable through the height of said side walls; and a stepping switch device operatively connected to said carrier to adjust the height of the latter; said stepping switch device including an externally threaded spindle angularly adjustable about an axis extending parallel to the height of said side walls; a double-toothed pawl oscillatably mounted on said carrier and having a tooth engaged with the thread of said spindle; the teeth of said pawl being spaced by a complete multiple of the pitch of the spindle thread plus one half of said pitch; support means on said carrier mounting said pawl for oscillation in a plane including the two pawl teeth; and electromagnetic means operatively connected to said pawl to oscillate the same to engage its teeth alternately with the thread of said spindle.

10. A printing machine, as claimed in claim 9, including means pivotally mounting said electromagnetic means on said carrier, said support means being fixed to said electromagnetic means; and a tension spring connected between said electromagnetic means and said carrier and operable to bias said electromagnetic means in a direction to maintain said pawl engaged with the thread of said spindle.

11. A printing machine, as claimed in claim 9, said support means being oscillatably mounted on said carrier for oscillation about a pivot spaced a distance from said spindle such that the pawl teeth, in the neutral position of said pawl, are disengaged from the spindle thread upon angular displacement of said support means.

12. A printing machine, as claimed in claim 9, including means mounting said spindle for angular adjustment, and an adjusting member connected to said spindle to angularly adjust the same for fine adjustment of the position of said carrier relative to the height of said receiving magazine side walls.

References Cited by the Examiner
UNITED STATES PATENTS

| | | | |
|---|---|---|---|
| 1,550,893 | 8/1925 | Elliot | 101—48 |
| 1,594,129 | 7/1926 | Stark | 101—48 |
| 1,833,938 | 12/1931 | Elliot | 101—49 |
| 2,026,101 | 12/1935 | Royster et al. | 101—57 |

DAVID KLEIN, *Primary Examiner.*

WILLIAM B. PENN, *Examiner.*

NATHANIEL A. HUMPHRIES, *Assistant Examiner.*